UNITED STATES PATENT OFFICE.

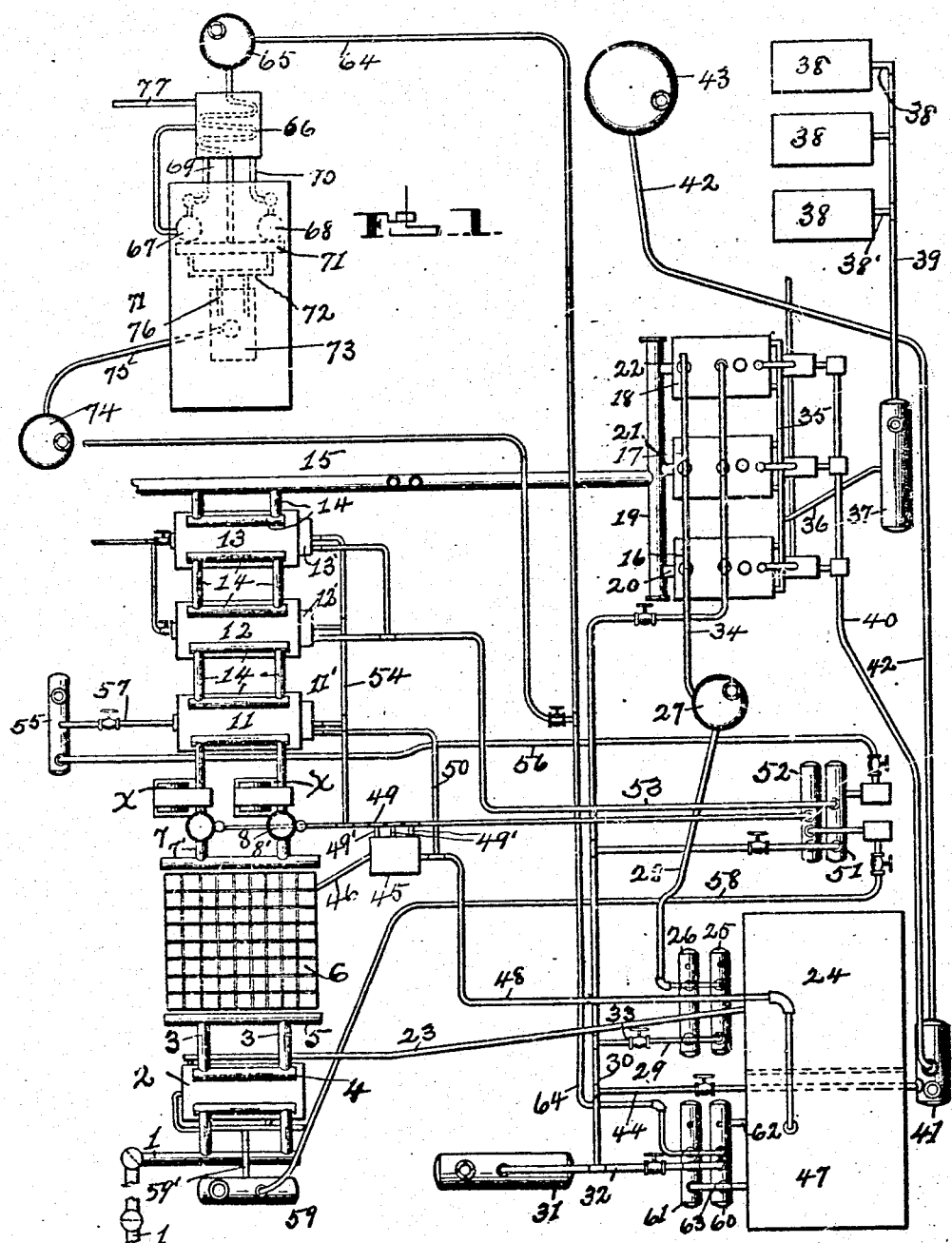

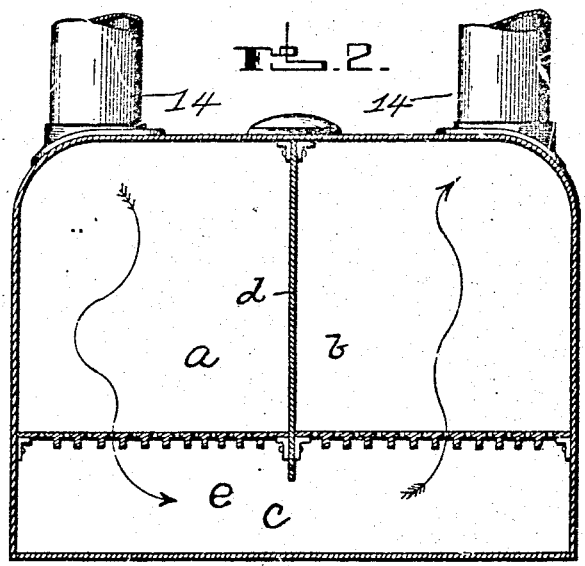
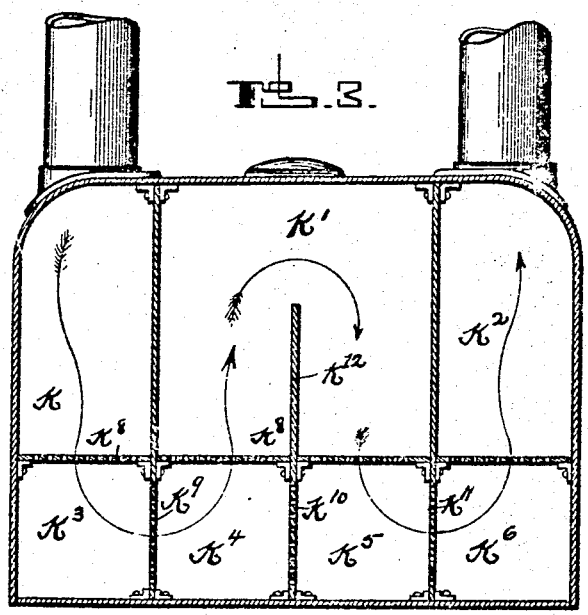

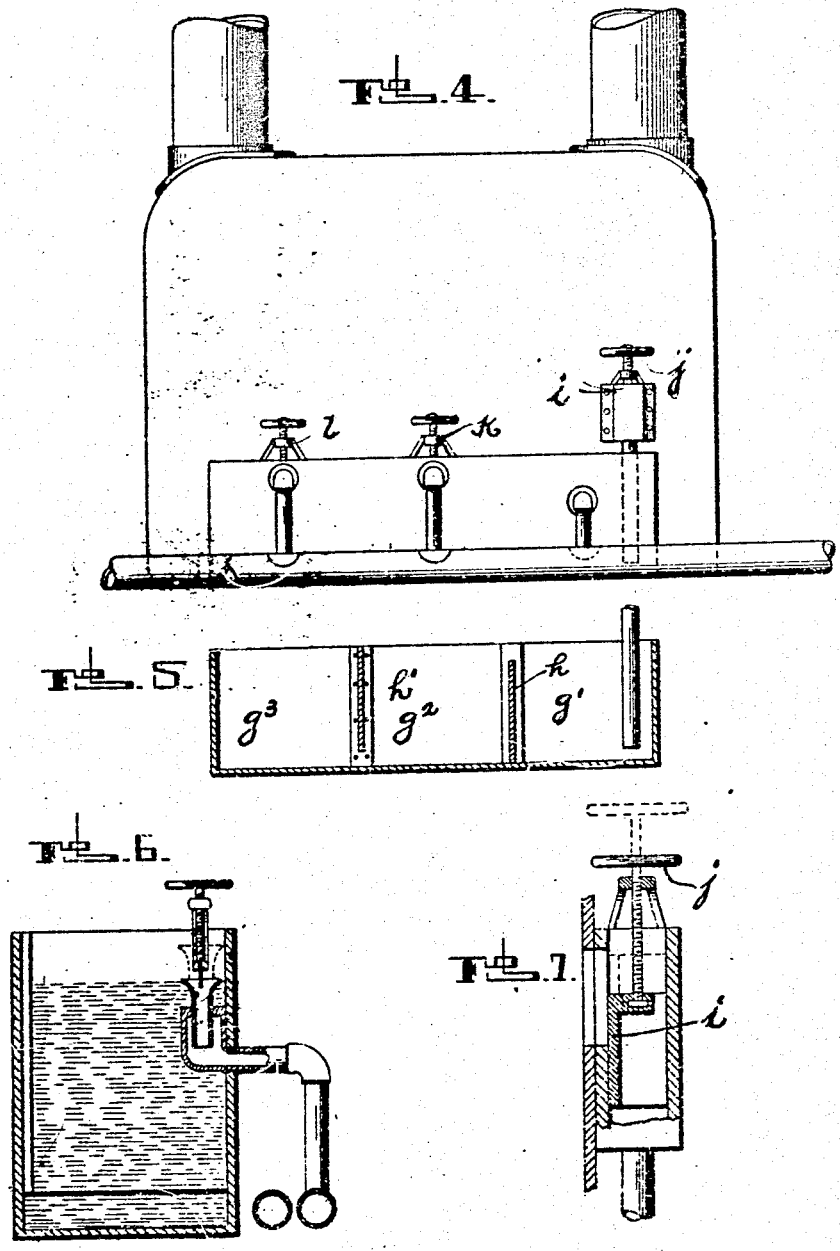

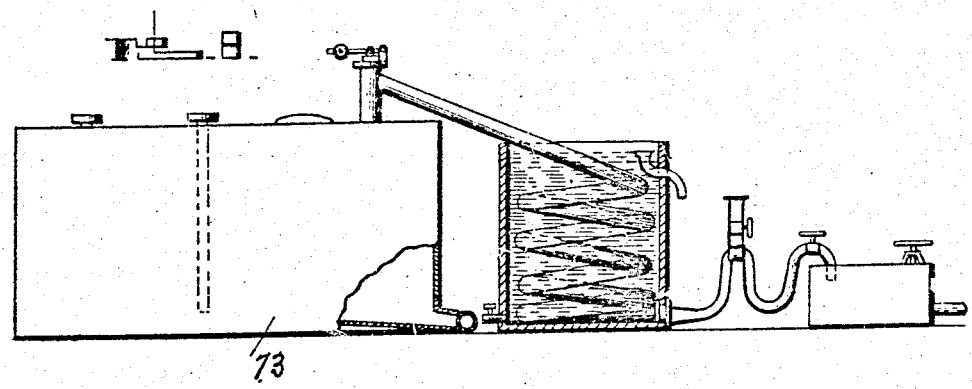
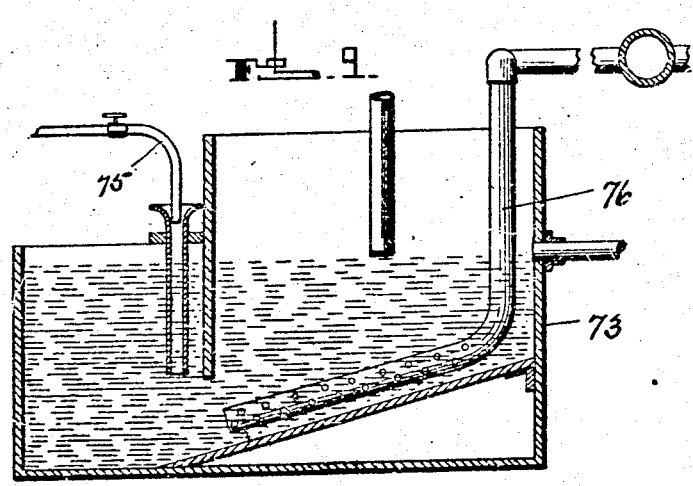
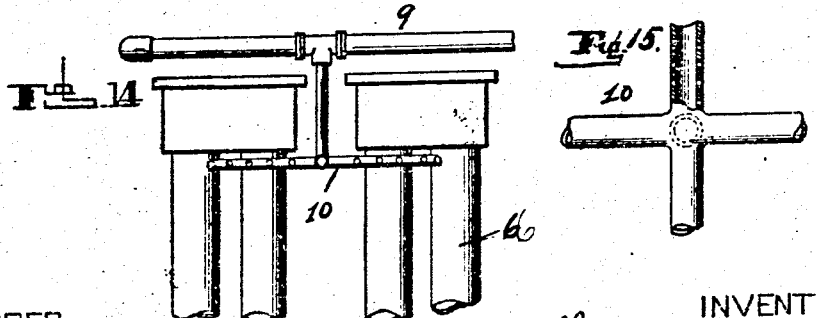

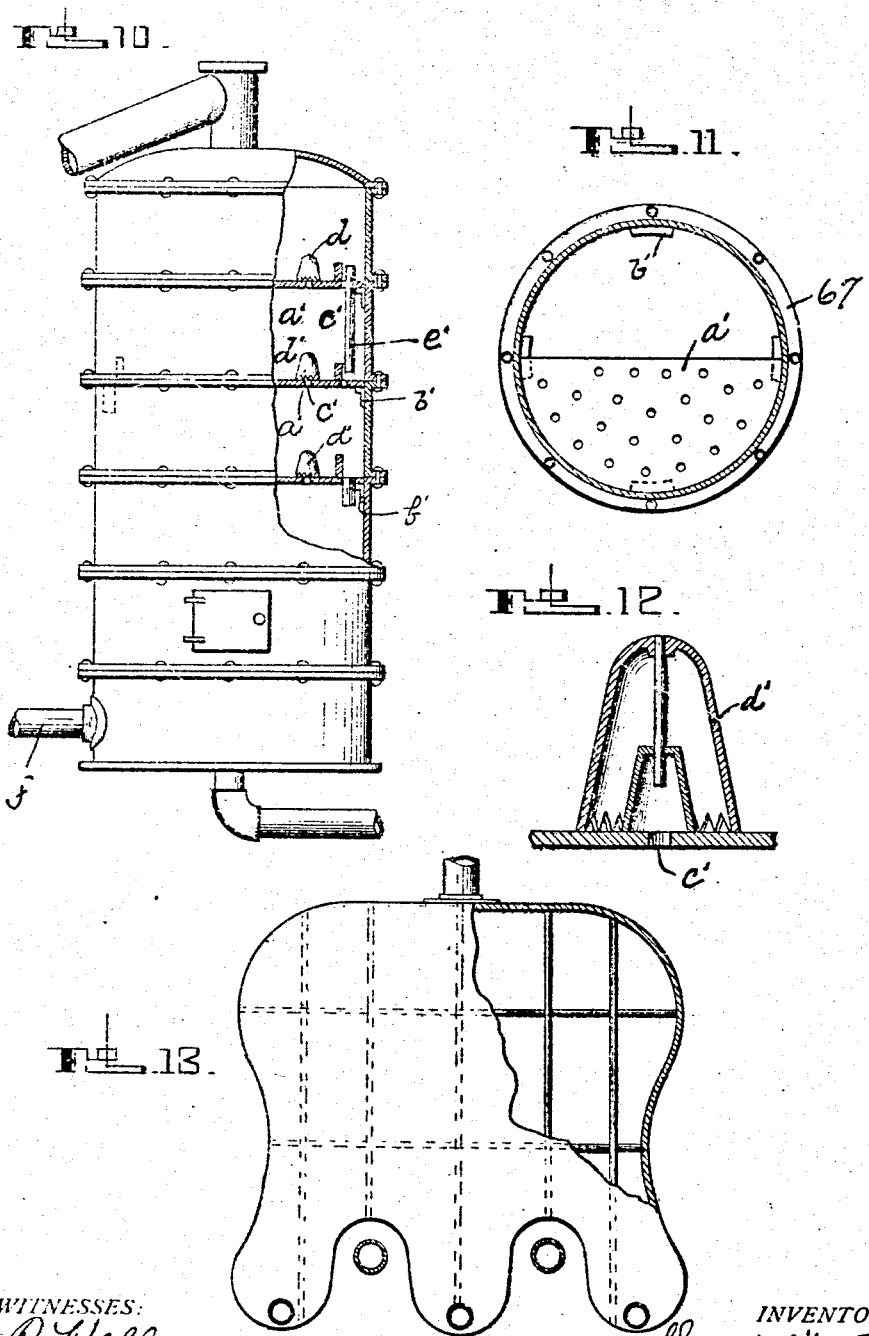

THOMAS McWATTERS, OF HAWKINS STATION, PENNSYLVANIA.

METHOD OF PURIFYING COAL-GAS AND COLLECTING BY-PRODUCTS.

No. 926,352.  Specification of Letters Patent.  Patented June 29, 1909.

Application filed September 20, 1901. Serial No. 75,650.

*To all whom it may concern:*

Be it known that I, THOMAS McWATTERS, a subject of the King of Great Britain and Ireland, residing at Hawkins Station, in the county of Allegheny and State of Pennsylvania, have invented a new and useful Improvement in Methods of Purifying Coal-Gas and Collecting By-Products, of which improvement the following is a specification, reference being had therein to the accompanying drawings, in which—

Figure 1 indicates a diagrammatic view of my improved plant for collecting the by-products of coal gas. Fig. 2 is a sectional elevation of one of the washers. Fig. 3 is the same of the final washer. Fig. 4 is an elevation of the washer. Fig. 5 is a detail of the tank connected with washer. Fig. 6 is a transverse section of the same. Fig. 7 is a sectional view of the regulating valve of washer. Fig. 8 is a view of still partly in section. Fig. 9 is a longitudinal sectional view of sulfate box or saturater. Fig. 10 is an elevation, partly in section, of one of the liquor towers. Fig. 11 is a sectional plan of same showing one of the series of perforated plates therein. Fig. 12 is a sectional elevation of one of the steam bells. Fig. 13 is an end view, partly in section, of one of the tar stills, and Figs. 14 and 15 are elevation and plan views, of the condenser spray.

My invention relates to method of producing and collecting the by-products of coal gas, and the object of my invention is to increase the percentage of ammonia and other valuable by-products of coal gas, and to this purpose my invention consists, broadly stated, in, first, immediately the heated gas has been passed into the first washer free the same from all or nearly all the heavy tar and thereafter, by maintaining the gas at the proper temperature, free the same of all or nearly all ammonia in the form of liquor.

In carrying out my invention I employ the system of apparatus illustrated in the accompanying drawings and hereinafter described, the same, however, as to arrangement and construction, may be somewhat varied without departing from my invention.

In carrying out my invention it is highly important that the heated gases be reduced in temperature from the maximum, say about 300 degrees Fahrenheit, to about 90 degrees Fahrenheit, in passing into and through the water contained in the first washer. A very high percentage of heavy tar is produced at 90 degrees Fhr., and down to 70 degrees Fhr., consequently all or nearly all the heavy tar is eliminated from the gas during its passage through the first washer, and it enters the condenser at a temperature low enough, say about 60 degrees Fhr., to prevent the ammonia passing off with the gas as a vapor, and at which temperature the ammonia, or a very high percentage thereof, is freed from the gas in the form of ammoniacal liquor. It is consequently highly important that the gas be reduced to and maintained at or below this temperature, in its passage through the condensers, in order to obtain the highest possible percentage of ammoniacal liquor and of high specific gravity. In other words—my invention primarily consists in separating the tar from the gas when the gas is at a considerable temperature, say at from 90 to 70 degrees Fhr. by passing the same through a body of water and eliminating the ammonia from the gas when at a lower temperature, say from 60 to 50 degrees Fhr., and subsequently, when the gas has been very greatly reduced in temperature and before it is admitted to the distributing main, eliminating the lighter tar and the liquor containing a less percentage of ammonia and of less specific gravity.

I will now describe the system of apparatuses and the operation thereof adapted to carry out my process or method, reference being had to the accompanying drawings, in which like reference characters indicate like parts wherever they occur.

Referring to said drawings, 1 is a conduit or pipe adapted to carry the gas from a producer or other source of supply (not shown) to the first or initial washer, 2, the gas which is at least 300 degrees Fhr. is then drawn through the water contained in said washer by means of engines $x$, $x$, and all or nearly all the heavy tar eliminated therefrom, and the temperature thereof reduced to about 90 degrees Fhr. or below that degree in its passage through the water contained in said washer. By the force of said engines the gas is then drawn down through the pipes, 3, 4 and 5 into the condensers 6, and the temperature reduced from below 90 degrees Fhr., at which degree it left the first washer, to 60 degrees Fhr. at which temperature all the ammonia contained in the gas is separated therefrom in the form of ammoniacal liquor, and the said liquor drawn therefrom as hereinafter described. The gas now reduced to a temperature below 60 degrees Fhr. is drawn by the force of said engines into the high cylindrical tanks 7 and 8, through the pipes 7' and 8' connecting said condenser with said tanks respectively. Prior to its exit from said condensers the temperature of the gas is reduced and maintained at or below 60 degrees Fhr. by the constant discharge of water over said condensers, the water being pumped or forced through the pipes 9, 9, into the spray pipe 10 the falling water therefrom striking the entire upper surface of said condenser for such purpose. The gas when reduced to this temperature is freed from all the heavy tar and substantially all the ammonia contained therein, and is then forced by said engines through the second series of washers 11, 12 and 13 which are connected by suitable pipes 14 to admit of this. In its passage through this second series of washers (the specific construction of which will be later described) the temperature of the gas is further reduced and is freed of whatever tar and ammonia that may remain therein, the tar at such stage of the process being very much lighter in quality than that obtained at the first washer when the gas was at much higher temperature and the ammoniacal liquor then obtained being very much reduced in strength; both these elements are drawn off and treated as hereinafter specified. The gas being entirely freed of all by-products is admitted from the final washer 13 into the distributing main 15 which may be provided with a series of test holes at which the gas may be tested to determine its chemical character and is conveyed from said distributing main to the tar stills 16, 17, 18 through the pipes 19, 20, 21, 22 for utilization as hereinafter set forth.

The by-products obtained by means of the process described comprising heavy tar, obtained at the first washer by the sudden reduction in temperature of the gas, ammoniacal liquor, obtained at the condenser where the temperature of the gas is still further reduced, and the light tar and weak ammoniacal liquor subsequently obtained are, respectively, drawn from the first washer condenser and the second series of washers, respectively, as hereinafter described, and subsequently treated as hereinafter set forth. The heavy tar eliminated from the gas at the first washer as heretofore described, is conveyed therefrom through the pipe 23 to the tar vat or tank, 24, therefrom it is admitted into the charging tank 27, through the pipe 28, by air pressure admitted to the cylindrical vessels 25 and 26 through the pipe 29 connected to the air pipe or conduit 30 which is connected with the air reservoir 31 by means of the pipe 32, the said pipe 29 being provided with a valve 33 to control the admission of air to said cylindrical vessels. From said charging tank 27, the tar is conveyed to the stills 16, 17, 18 (the specific construction of which will be later described) by means of the pipe or conduit 34 and by distillation, pitch and oil produced therefrom. The pitch is conveyed from said stills through the pipe 35 and pipe 36 which connects with the cylindrical vessel 37, and from thence it is conveyed to the pitch vats 38, 38, 38, by means of the pipe 39 which is connected to said vats by the short pipes, 38', 38'. The oil is drawn from the stills through pipe 40, to the cylindrical tank 41 and therefrom forced through the pipe 42, into the oil stock tank 43, the said vessel being connected to the air reservoir 31 by means of the pipe 44, to admit of this. The ammoniacal liquor eliminated from the gas at the condenser is carried therefrom to the separator 45 (the specific construction of which will be described later) through the pipe 46 and from the separator the said liquor is conveyed to the liquor tank 47, through the pipe 48.

It is possible under certain conditions that ammoniacal liquor of sufficient strength to be conveyed to the liquor tank may be collected in the tanks 7, 8, between the condenser and the first washer of the second series together with the light tar, in which event such liquor is conveyed to the separator, and said tanks, which are connected to the pipe 49, also communicate with the separator by means of the short pipes, 49', 49', 49'. It may also occur that under conditions hereinafter set forth ammoniacal liquor of sufficient strength to be charged into the liquor tank is obtained at the first washer of the second series which is connected with pipe 48 by means of pipe 50 to carry such liquor to said liquor tank. Ammoniacal liquor too weak to charge into the liquor tank is obtained at the second and final washer of the second series of washers and also weak tar, which liquor and tar are carried, respectively, to the two cylindrical tanks, 51, 52, by means of pipes 53 and 54, connected therewith, which liquor contained in tank 51, is carried to tank 55 by means of pipe 56, and this liquor is again carried through washer 11, through pipe 57, with new gas to be operated upon. The light tar contained in tank 52, is carried through pipe 58, into the tank 59, and therefrom into the first washer 2, of the second series of washers, by means of the short pipe 59', where its strength is so considerably augmented that it may be conveyed to the heavy tar tank through pipe 23, as heretofore described. The ammoniacal liquor contained in tank 47 is run into the cylindrical vessels 60 and 61 which are connected therewith by the short pipes 62, 63, and is forced therefrom by air pressure from the reservoir 31, connected therewith by pipe 32, through the conduit or pipe 64, into the liquor charging tank, 65. The ammoniacal liquor contained in charging tank 65 is passed therefrom through the coil 66, into the towers 67, 68, by means of pipes 69, 70, which enter the same near the top thereof; steam is admitted to the said towers (the particular construction of which will be later described—which acting upon the falling liquor raises the temperature thereof and converts the ammonia therein into vapor which passes out through pipes 71, 72, into the sulfate box or saturater 73, which contains sulfuric acid which is charged therein from tank 74 through the pipe 75.

To get the best possible results the acid is diluted from 144 in strength to 48; it is important to so dilute the acid as when above this in strength the resultant sulfate of ammonia carries an excess of acid and when below this in strength the ammoniacal vapor is not converted into a sulfid and escapes as vapor. The pipe 76, through which the vapor is conveyed to the sulfate box is perforated at the end and submerged in the acid for the purpose of permitting the vapor to be discharged into the acid in series of jets and therein converted into sulfate of ammonia. It is important therefore to keep the acid at the proper degree of dilution mentioned to obtain all the ammonia and in the best condition for commercial use. The washers are all constructed as shown in Fig. 2, excepting washer 13, which is constructed as shown in Fig. 3. In Fig. 2, the washer is shown as being subdivided into compartments $a$, $b$ and $c$; $a$ and $b$ being separated by the vertically disposed partition $d$, and $c$ from both $a$ and $b$, by the horizontally disposed partition $e$, which is provided with numerous minute perforations through which the gas ascends and passes out of the pipes 14, in passing out of either of the washers 11 to 13, inclusive, or through pipe 4, when passing from washer 2 into the condenser 6. The final washer 13, is constructed interiorly as shown in Fig. 3, in which the interior is subdivided into series of compartments, $K$ $K'$, $K^2$, $K^3$, $K^4$, $K^5$, $K^6$. $K$ is separated from $K'$ by the solid vertical partition $K^1$, and from $K^3$ by the perforated horizontally disposed partition $K^2$. $K^3$, $K^4$, $K^5$, $K^6$, are separated by perforated partitions $K^{10}$, $K^{10}$, $K^{11}$, and the compartment $K'$ is subdivided by the partition $K^{12}$, which extends about half way the height of said compartment. A constant supply of water is maintained in all the washers, sufficient to just submerge the partition $e$, through which the gas rushes and is freed, at the first washer, of all the heavy tar which is drawn off directly therefrom. The washers 11, 12, and 13 of the second series are provided with extensions 11′, 12′, 13′ into which the light tar and weak ammoniacal liquor is received and out of which they are drawn as heretofore described. The said extensions being subdivided into compartments $g'$, $g^2$, $g^3$, by the partitions $h$, $h'$, $h''$ terminating at a short distance below the upper edge of the sides of the tank and having a valve $i$ or overflow capable of being adjusted to varying liquor or water levels by the screw $j$ for the purpose of taking off the light tar as heretofore specified at different levels; the compartments $g^2$, $g^3$, are provided with valves $k$ and $l$ similar in construction to valve $i$ and for the purpose of taking off, at various levels the heavy tar in $g^2$ and the ammoniacal liquor in $g^3$ as heretofore specified, the partition $h^2$ terminates at about six inches from the bottom of compartment $g^2$ in order to deposit the heavy tar therein up to such level.

All of the washers, and also the separator, are provided with valves of similar construction to that shown in Fig. 7 and are for the purpose of regulating the level of the overflow of the different by-products contained in the chambers to which they are applied. The towers into which and through which the ammoniacal liquor finally falls are shown in section in Fig. 10, and are provided with steam inlet pipes $j$ $j$, through which steam from any suitable source enters said towers, and coming in contact with the falling ammoniacal liquor, the descent of which is broken by coming in contact with the ledges arranged in said towers, converts said liquor into an ammoniacal vapor which enters the sulfate box or saturater, through the pipe 16, the lower end of which is perforated, through which the vapor escapes and passes upward through the diluted sulfuric acid, converts said vapor into a sulfate of ammonia which is removed therefrom by ladles. After or during the elimination of the ammonia the residue contained in the sulfate box is conveyed to an evaporating pan (not shown), by means of the pipe 77, where the liquid is evaporated and converted into potash. The said towers 67, 68, are provided with series of perforated plates $a'$ $a'$ supported upon lugs $b'$ formed on the sides thereof, the said plates having numerous perforations $c'$ $c'$ immediately over each of which is loosely secured bells or cone shaped cups $d'$ $d'$ into which the steam admitted through the small perforations is received and passes out through the lower serrated sides, coming in contact with the ammoniacal liquor which overflows around the same and is discharged into the next succeeding plate through pipes $e'$ thereby heating up the liquor and converting the ammonia contained therein into vapor which is conveyed from said towers into and through the sulfate box as heretofore described.

Having described my invention what I claim and desire to secure by Letters Patent is—

1. The process of purifying coal gas and collecting the by-products thereof which consists, first, in cooling the gas sufficiently to precipitate out the heavy tar and separately collecting said heavy tar, second, reducing the temperature of the gas, after precipitation of the heavy tar, to such an extent that the ammonia in the gas will be precipitated in the form of ammoniacal liquor and separately collecting said ammoniacal liquor, and finally, still further reducing the temperature of the gas sufficiently to remove therefrom the lighter tar, and the weaker ammonia in the form of ammoniacal liquor before introducing the gas to the distributing main, and separately collecting the weaker ammoniacal liquor and lighter tar.

2. The process of purifying coal gas and collecting the by-products thereof which consists, first, in passing the gas through a water washer and thereby reducing the temperature of the gas sufficiently to precipitate out the heavy tar and separately collecting said heavy tar, second, passing the gas through a condenser and thereby reducing the temperature of the gas sufficiently to precipitate the ammonia in the form of ammoniacal liquor and separately collecting said ammoniacal liquor, and finally, passing the gas through another water washer and thereby still further reducing the temperature of the gas sufficiently to remove therefrom the lighter tar, and the weaker ammonia in the form of ammoniacal liquor before introducing the gas to the distributing main and separately collecting the weaker ammoniacal liquor and lighter tar.

3. The herein described method or process of purifying coal gas and collecting the by-products thereof which consists in first, charging the gas at a temperature of 300 degrees Fahrenheit or thereabout, through a washer and thereby reducing the temperature of the gas to from 90 to 70 degrees Fahrenheit and eliminating by such reduction of temperature substantially or nearly all of the tar from the gas and separately collecting the tar, then lowering the temperature of the gas to from 60 to 50 degrees Fahrenheit and thereby eliminating the ammonia from the gas in the form of ammoniacal liquor and separately collecting the ammoniacal liquor, and by subsequent treatment maintaining the gas at a relatively low temperature and thereby eliminating any tar or ammonia remaining associated with the gas before introduction of the gas to the distributing main.

4. The herein described method or process of purifying coal gas and collecting the by-products thereof, which consists in passing the gas at a temperature of 300 Fahrenheit or thereabout, through a washer and thereby reducing the temperature of the gas to a temperature sufficient to eliminate substantially all the tar from the gas, then lowering to and maintaining the gas at a temperature sufficient to prevent the ammonia present assuming gaseous form, and finally by a further reduction in temperature eliminate the lighter tar and the liquor containing the remaining ammonia.

In testimony whereof I have hereunto signed my name in the presence of two subscribing witnesses.

THOMAS McWATTERS.

In the presence of—
CLARENCE A. WILLIAMS,
ALEXANDER McKIM, Sr.